(12) United States Patent
Van Ruymbeke et al.

(10) Patent No.: US 12,724,708 B1
(45) Date of Patent: Sep. 1, 2026

(54) WRITING DATA AND RESILIENCE BITS TO REGISTER MEMORY

(71) Applicant: ARTERIS, INC., Campbell, CA (US)

(72) Inventors: Xavier Van Ruymbeke, Montigny-le-Bretonneux (FR); Michael Moriaud, Elancourt (FR); Frederic Greus, Epernon (FR); Sylvain Meliciani, Elancourt (FR)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 19/095,022

(22) Filed: Mar. 30, 2025

(51) Int. Cl.
*G06F 12/00* (2006.01)
*G06F 12/06* (2006.01)

(52) U.S. Cl.
CPC .................................... *G06F 12/06* (2013.01)

(58) Field of Classification Search
CPC ........ G06F 12/06; G06F 12/0238; G06F 9/48; G06F 9/4812
USPC .......................................................... 711/154
See application file for complete search history.

(56) References Cited

U.S. PATENT DOCUMENTS 9,213,609 B2 * 12/2015 Hansen ............... G06F 11/2097
2012/0272036 A1 * 10/2012 Muralimanohar ...... G06F 12/06 711/202
2014/0195480 A1 * 7/2014 Talagala ............. G06F 16/2365 707/610
2021/0056020 A1 * 2/2021 Ramesh .................. G06F 12/08

FOREIGN PATENT DOCUMENTS

TW I269168 B * 12/2006 ............... G06T 1/60

* cited by examiner

*Primary Examiner* — Mardochee Chery
(74) *Attorney, Agent, or Firm* — Dana Legal Services; Jubin Dana

(57) ABSTRACT

In an electronic system, data is written to a write address in register memory. Chunks of the data are decomposed into a plurality of data sub-granules. Bits of the write address are distributed to the data sub-granules. An address sub-granule is created for any bits of the write address that were not distributed to the data sub-granules. A resilience algorithm is used to compute resilience bits for each of the sub-granules. The chunks and the resilience bits are written to the register memory.

20 Claims, 7 Drawing Sheets

FIG. 1

WRITE DATA IS DECOMPOSED INTO CHUNKS
410
CHUNKS ARE DECOMPOSED INTO DATA SUB-GRANULES
420
BITS OF WRITE ADDRESS ARE DISTRIBUTED TO ONE OR MORE DATA SUB-GRANULES
430
AT LEAST ONE ADDRESS SUB-GRANULE IS CREATED FROM ANY LEFTOVER ADDRESS BITS
440
RESILIENCE BITS ARE COMPUTED FOR EACH OF THE SUB-GRANULES
450
DATA AND RESILIENCE BITS ARE WRITTEN TO REGISTER MEMORY
460

WRITING DATA AND RESILIENCE BITS TO REGISTER MEMORY

TECHNICAL FIELD

The present technology is in the field of electronic systems.

BACKGROUND

Network-on-chip (NoC) technology is being used at many semiconductor companies to support an ever-increasing number of cores on a single chip and a demand for ever-increasing processing power related to artificial intelligence (AI) and other applications. An NoC is superior to point-to-point connectivity by way of a more scalable communication architecture that makes use of packet-based transmissions.

Consider a system on chip (SoC) that includes a central processing unit (CPU), system memory, and a NoC. When the CPU generates a request transaction to write data to the system memory, it sends the request transaction to the NoC. The NoC buffers data in the request transaction and then sends the buffered data to the system memory via packet-based transmission.

SUMMARY

In accordance with various embodiments and aspects herein, in an electronic system, a method of writing data to a write address in register memory includes decomposing chunks of the data into a plurality of data sub-granules; distributing bits of the write address to the data sub-granules; creating an address sub-granule for any bits of the write address that were not distributed to the data sub-granules; using a resilience algorithm to compute resilience bits for each of the sub-granules; and writing the chunks and the resilience bits to the register memory.

In accordance with various embodiments and aspects herein, a network-on-chip includes a transport interconnect, and a plurality of network interface units (NIUs) connected to the transport interconnect. At least one of the NIUs includes register memory, and a resilience generator. The resilience generator is configured to decompose chunks of data into a plurality of data sub-granules; distribute bits of a write address to the data sub-granules; create an address sub-granule for any bits of the write address that were not distributed to the data sub-granules; compute resilience bits for each of the sub-granules; and write the chunks and the resilience bits to the register memory.

In accordance with various embodiments and aspects herein, an electronic system includes an initiator, and a network-on-chip (NoC). The NoC includes a network interface unit (NIU) configured to receive data from the initiator, decompose the data into chunks, decompose the chunks into a plurality of data sub-granules; distribute bits of the write address to the data sub-granules; create an address sub-granule for any bits of the write address that were not distributed to the data sub-granules; compute resilience bits for each of the sub-granules; and write the chunks and the resilience bits to register memory.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

FIG. 1 shows an electronic system including a network-on-chip in accordance with various aspects and embodiments herein.

DETAILED DESCRIPTION

Figure 2:
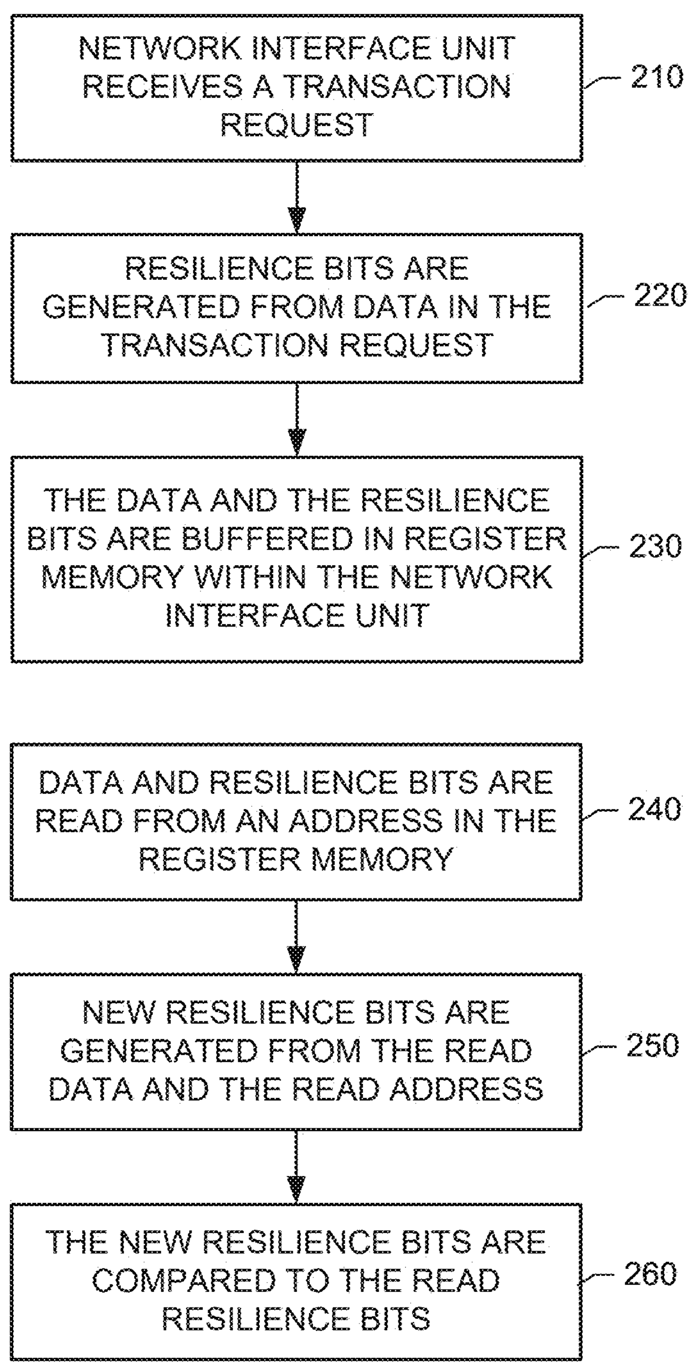
FIG. 2 shows methods performed by the network-on-chip in accordance with various aspects and embodiments herein.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms “a,” “an” and “the” include plural referents unless the context clearly dictates otherwise. Reference throughout this specification to “one embodiment,” “an embodiment,” “certain embodiment,” “various embodiments,” or similar language means that a particular aspect, feature, structure, or characteristic described in connection with the embodiment is included in at least one embodiment of the invention.

Thus, appearances of the phrases “in one embodiment,” “in at least one embodiment,” “in an embodiment,” “in certain embodiments,” and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
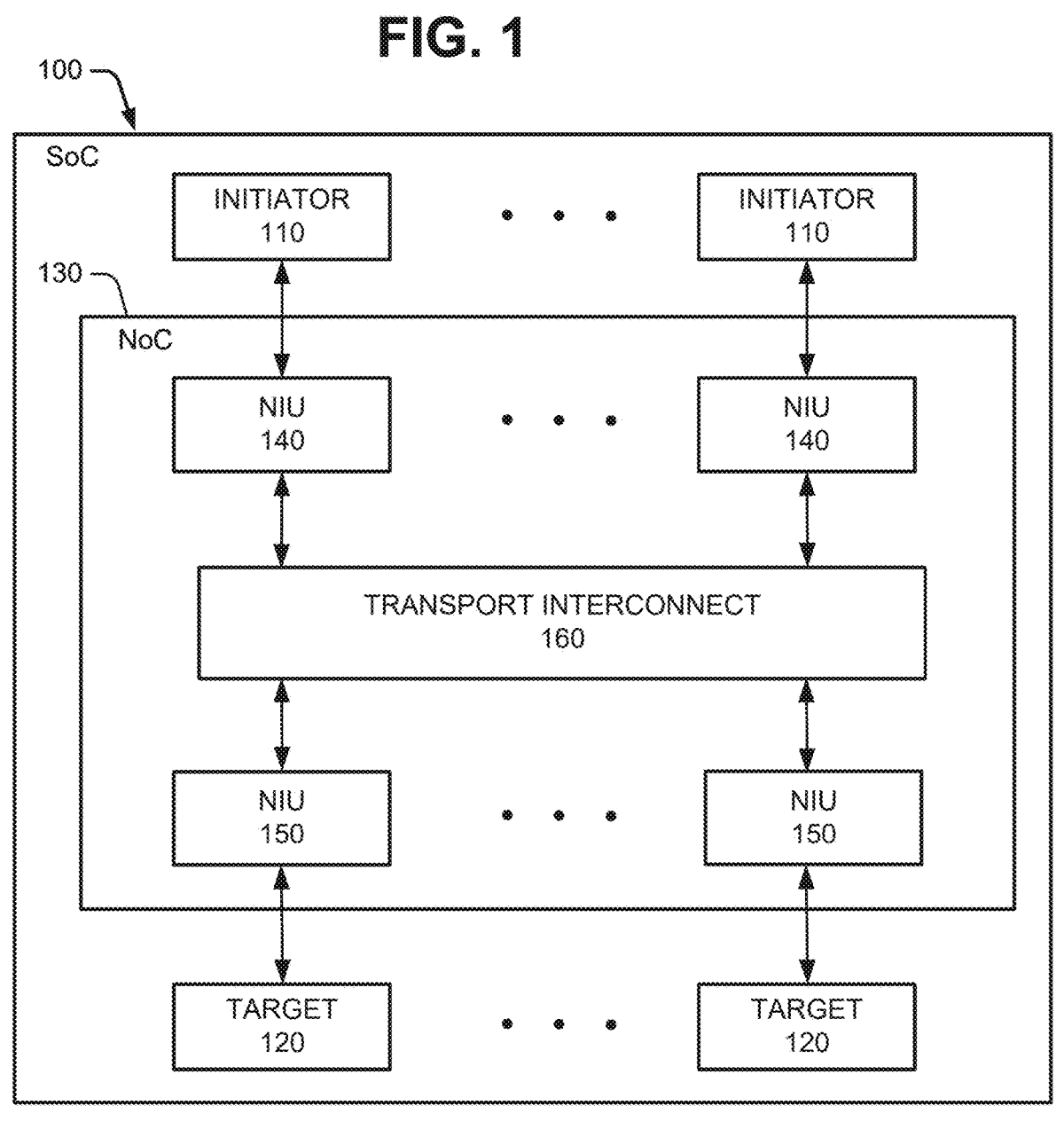

Reference is made to FIG. 1, which illustrates a system-on-chip (SoC) 100, which is an example of an electronic system. The SoC 100 includes a plurality of initiators 110 and targets 120. Examples of the initiators 110 include central processing units (CPUs), graphics processing units (GPUs), accelerators, cameras, and direct memory access (DMA) controllers. Examples of the targets 120 include volatile memory, persistent memory, and peripherals.

The SoC 100 further includes a network-on-chip (NoC) 130. The NoC 130 sends request transactions from an initiator 110 to one or more targets 120. A request transaction may include an address of the target 120. The NoC 130 decodes the address and transports the request transaction. The target 120 handles the request transaction and may send a response transaction, which is transported back to the initiator 110 via the NoC 130.

The NoC 130 includes a plurality of network interface units (NIUs) 140 and 150 and a transport interconnect 160. Each initiator 110 is coupled to the transport interconnect 160 via a corresponding initiator NIU 140. Each target 120 is coupled to the transport interconnect 160 via a corresponding target NIU 150.

Each NIU 140 or 150 is configured to convert the protocol used by its corresponding initiator 110 or target 120 into a transport protocol used inside the NoC 130. The transport protocol is typically based on the transmission of packets.

The transport interconnect 160 includes switches, adapters, and buffers for transporting packets between the NIUs 140 and 150. Switches may be used to route flows of traffic between source and destinations. Adapters may be used to deal with various conversions between data width, clock and power domains. Buffers may be used to insert pipelining elements to span long distances, or to store packets to deal with rate adaptation between fast senders and slow receivers or vice-versa.

In general, the NoC 130 is highly configurable. Certain NoC components such as the NIUs 140 and 150 and switches may have many different possible configurations. Other NoC components such as buffers may have relatively fewer possible configurations. During design, parameters of the NoC components may be varied to optimize the cost, performance, and power consumption.

Reference is now made to FIG. 2, which illustrates a method performed by the NoC 130 when the NoC 130 receives a request transaction from one of the initiators 110. The transaction request includes data and an address of a target 120.

Figure 4:
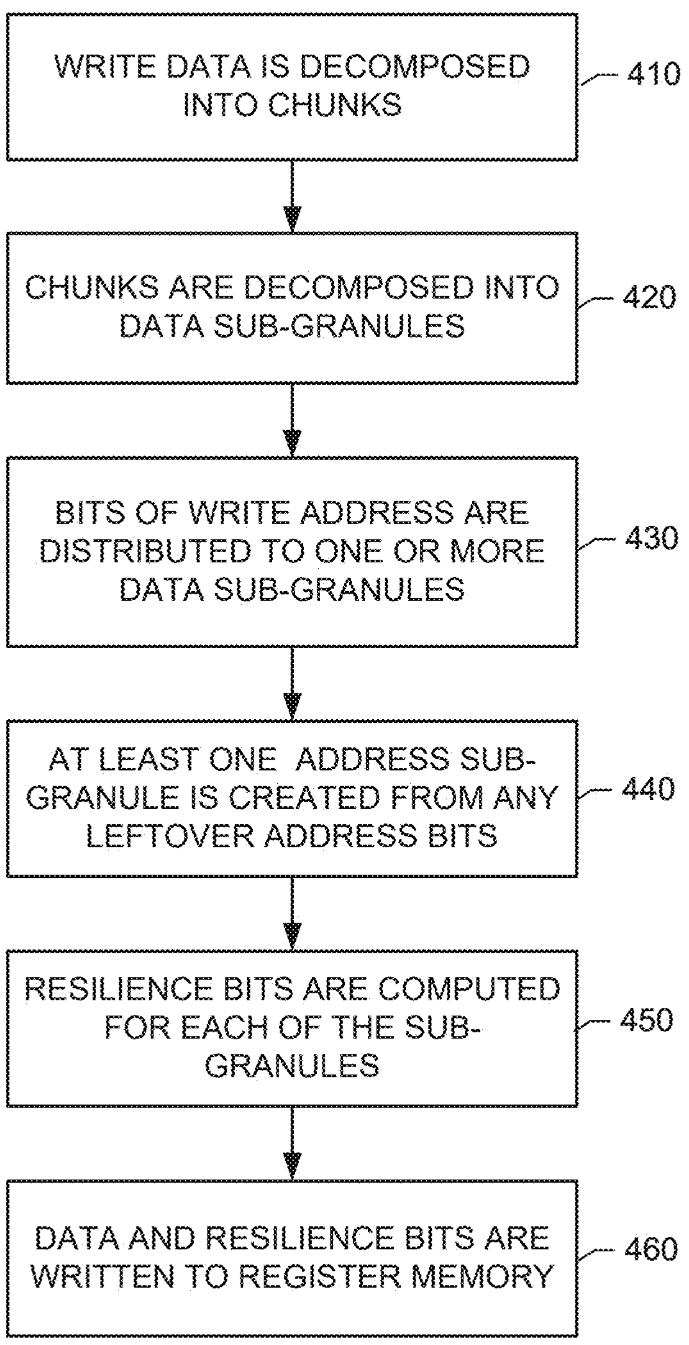
FIG. 4 shows a method of writing data bits and resilience bits to register memory in accordance with various aspects and embodiments herein.

At block 210, the transaction request is received by an NIU 140. At block 220, resilience bits such as error correction code are generated from the data in the transaction request. At block 230, the data and the resilience bits are buffered in register memory within the NIU 140. A method for buffering the data and the resilience bits is illustrated in FIG. 4 and described below.

FIG. 2 also shows a method that is performed by the NIU 140 at a later time, when the buffered data is accessed. At block 240, the data and the resilience bits are read from an address in the register memory. At block 250, new resilience bits are generated from the read data and the read address. At block 260, the new resilience bits are compared to the resilience bits read from the register memory. If the new resilience bits match the read resilience bits, the buffered data is not corrupted, the NIU 140 sends the data to the transport interconnect 160. If a match does not occur (e.g., there was at least one bit flip), the data is corrupted. Either the corrupted data is corrected and the corrected data is sent to the target 120, or the error is detected and a fault is generated.

Figure 3:
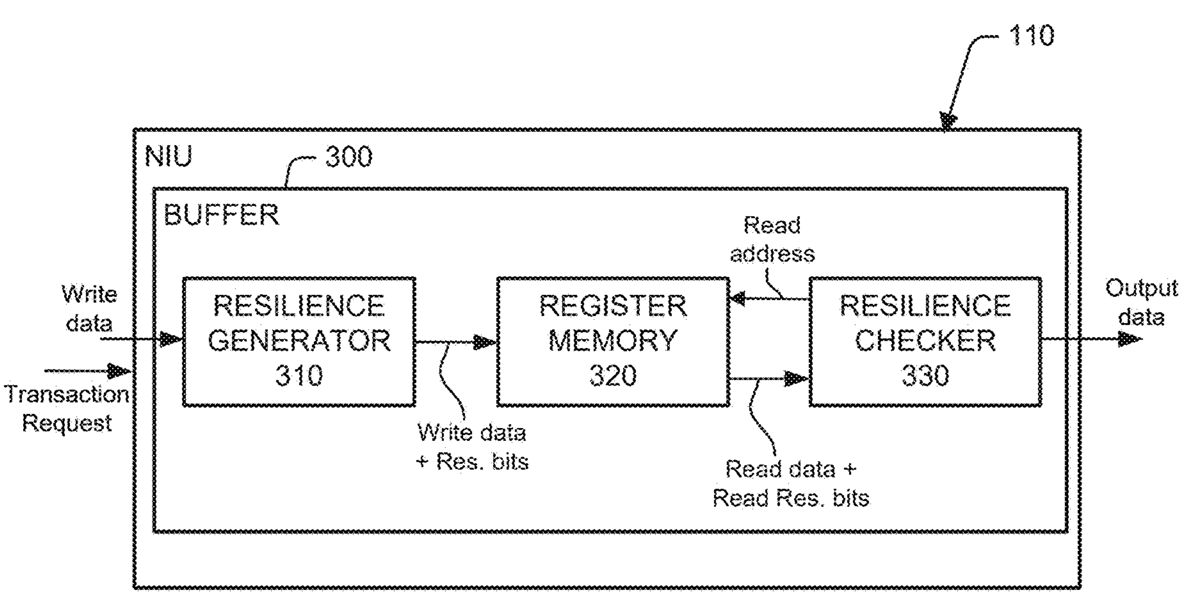
FIG. 3 shows a network interface unit of the network-on-chip in accordance with various aspects and embodiments herein.

Reference is now made to FIG. 3, which shows an example of a buffer 300 within an NIU 140 or 150. The buffer 300 includes a resilience generator 310, register memory 320, and a resilience checker 330. The register memory 320 includes a plurality of addressable registers. Data can be written to and read from each register. The register memory 320 may be implemented with static random access memory (SRAM).

The resilience generator 310 is configured with a resilience algorithm to generate resilience bits from data to be buffered (the "write data") and the address at which the data will be buffered (the "write address"). This operation is combinatorial and does not add an extra cycle of latency to write the data and the resilience bits to the register memory 320. An example operation of the resilience generator 310 is illustrated in FIG. 4.

Figure 7:
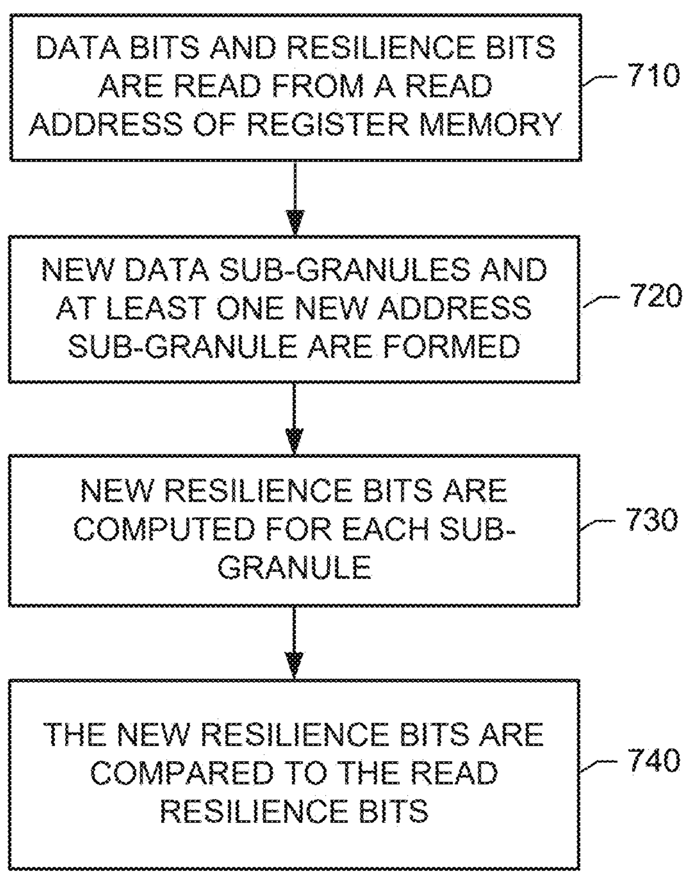
FIG. 7 shows a method of accessing data from an address of register memory in accordance with various aspects and embodiments herein.

The resilience checker 330 is configured to receive a read address and respond to the read address by accessing data and resilience bits at the read address (the "read data" and the "read resilience bits") from the register memory 320. The resilience checker 330 computes new resilience bits from the read data (using the same algorithm as the resilience generator 310), and compares the new resilience bits to the read resilience bits. The comparison indicates whether the read data is corrupted. The comparison may also be used for error correction or error detection. An example operation of the resilience checker 330 is illustrated in FIG. 7.

During design of the NoC 130, Intellectual property (IP) blocks are selected from a NoC architect's library, and the selected IP blocks are instantiated. An IP block for the buffer 300 may have multiple parameters that are configured (parameter-driven) during instantiation, including the following parameters: wordNumber, resilienceAlgorithm, maxDepth, beGrpLst, and addrBeGrpIdx. The wordNumber parameter represents address width and is used to compute the number of address bits.

The resilienceAlgorithm parameter specifies the type of resilience algorithm used by the resilience generator 310 and the resilience checker 330. Examples of the resilience algorithm include, but are not limited to Parity, Hsiao Double Error Detection (DED), and Hsiao Single Error Correction, Double Error Detection (SECDED). The Hsiao algorithm is a modified Hamming code, with an odd-weight-column, because every column contains an odd number of 1's. Hsiao DED is simpler and saves one resilience bit compared to Hsiao SECDED.

The maxDepth parameter specifies the maximum number of XOR logic levels used to compute resilience bits. The maxDepth parameter can be translated as the maximum number of data bits for which a group of resilience bits (the resilience value) covers. The number of data bits depends also on the resilience algorithm. The following table illustrates data bit coverage for different logic levels for each of the Parity, Hsiao DED and Hsiao SECDED algorithms.

TABLE

| | PARITY | | Hsiao DED | | Hsiao SECDED | |
|---|---|---|---|---|---|---|
| maxDepth | #resilience bit(s) | Cover #Data bits | #resilience bit(s) | Cover #Data bits | #resilience bit(s) | Cover #Data bits |
| 3 | 1 | 8 | 4 | 11 | 5 | 11 |
| 4 | 1 | 16 | 5 | 26 | 6 | 26 |
| 5 | 1 | 32 | 6 | 57 | 7 | 57 |
| 6 | 1 | 64 | 7 | 120 | 8 | 120 |
| 7 | 1 | 128 | 8 | 247 | 9 | 247 |

Figure 5:
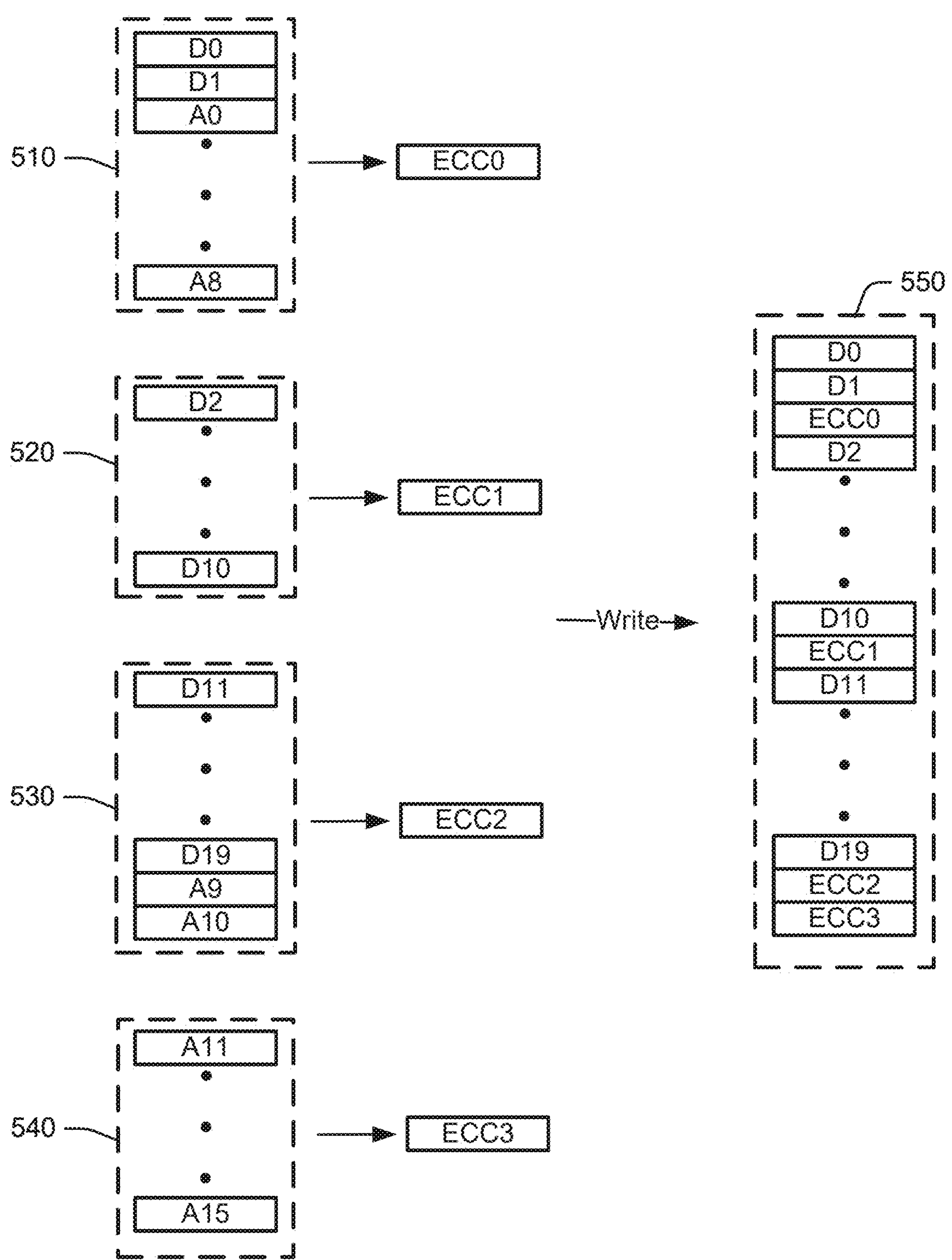
FIG. 5 shows a first example of data bits and resilience bits that are written to register memory in accordance with various aspects and embodiments herein.
Figure 6:
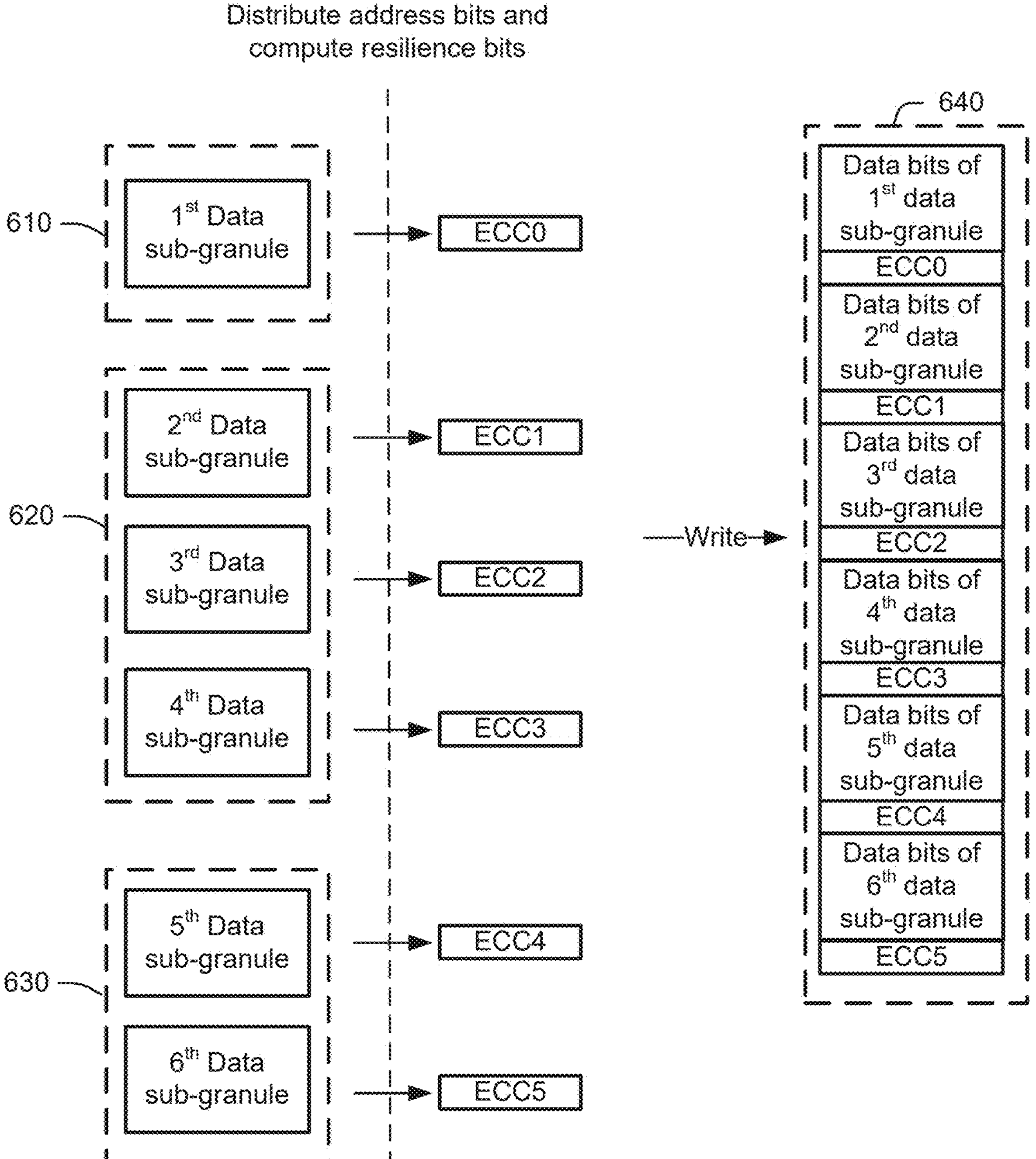
FIG. 6 shows a second example of data bits and resilience bits that are written to register memory in accordance with various aspects and embodiments herein.

The beGrpLst parameter defines the granularity with which a chunk of data is written to the register memory 320. More specifically, the beGrpLst parameter defines the number of bits per chunk of data. For example, the beGrpLst parameter may be configured as by the list [x_1, . . . x_n). This list indicates that a first chunk of data has x_1 data bits, . . . and an $n^{th}$ chunk has x_n data bits. Examples of the beGrpLst parameter are illustrated in FIGS. 5 and 6.

The maxDepth parameter and the resilienceAlgorithm parameter are used to compute the number of covered bits. Dividing x_* by the number of covered bits gives the number of data sub-granules.

The beGrpLst parameter may be configured by the way data is stored in the buffer 300. For example, a target 120 in FIG. 1 has a 16-byte read bus but an initiator 110 has a 32 byte bus. The data is reassembled to 32 bytes and written to the register memory 320 in two chunks of 16 bytes.

The addrBeGrpIdx parameter indicates those chunks that are not authorized to have address bits distributed to it. An example of the addrBeGrpIdx parameter is illustrated in FIG. 5.

Consider the example where incoming data has a length of 32 bits, the register memory 320 is 16-bit addressable, resilienceAlgorithm=Hsiao SECDED, maxDepth=4, and beGrpLst=[26,6]. The beGrpLst parameter indicates that the 32 bits of incoming data are to be decomposed into a first chunk having 26 data bits and a second chunk having six bits. The Table indicates that six resilience bits are used to cover 26 bits of data. To protect the 32 bits of data according to these parameters, the first chunk is decomposed into a first sub-granule including 26 bits of the data, and a first resilience value is generated to protect the 26 bits in the first sub-granule.

Further, the second chunk is decomposed into a second sub-granule including the remaining 6 bits of data. A second resilience value for the second sub-granule can cover an additional 26−6=20 bits. Advantageously, the 16-bit address is also included in the second sub-granule, and the second resilience value is computed to cover the 22 bits in the second sub-granule.

Reference is now made to FIG. 4, which shows a method of writing data bits and resilience bits to a write address in the register memory 320. At block 410, write data is decomposed into data chunks. The data may be decomposed into chunks according to the beGrpLst parameter.

At block 420, the chunks are decomposed into data sub-granules. As will be discussed below, each chunk may be decomposed into one or more sub-granules. One or more of the data sub-granules has bits available to include bits of the write address.

At block 430, some or all of the bits of the write address are distributed to one or more of the data sub-granules. At block 440, if all of the address bits cannot be distributed to the data sub-granules, then one or more address sub-granules are created with these leftover address bits. The size of each address sub-granule is up to the maximum allowed number of bits to cover as defined by the maxDepth parameter.

At block 450, a selected resilience algorithm is used to compute resilience bits for each of the sub-granules. Dedicated resilience bits are computed for each of the data granules to avoid read modify write operation in the register memory 320. As used herein, the term "ECCx" refers to dedicated resilience bits, that is, a resilience value, for the xth sub-granule.

At block 460, the data chunks and the resilience bits are written to the register memory. For example, a block is written to the register memory, where the block includes the sub-granules (data bits only) and the ECCs interleaved with the sub-granules such that each sub-granule is followed by its ECC. Any sub-granules including only address bits are not written to the register memory; only the corresponding ECC is written.

The method of FIG. 4 protects data that is buffered in the NoC 130. If one or more bits flip occurs, the error can be detected and possibly corrected.

Distributing the address bits to the data sub-granules is more computationally efficient than processing the data bits and the address bits separately. It can eliminate or reduce the need to compute dedicated resilience bits for the write address. Storing the ECCs with the data increases the memory size but doesn't impact its throughput.

Reference is now made to FIG. 5, which shows an example in accordance with the method of FIG. 4. In this example, resilienceAlgorithm=Hsiao_DED, maxDepth=3, beGrpLst=[2,9,9], and addrBeGrpIdx=[0,2]. Each sub-granule can be covered with five resilience bits.

The left hand side of FIG. 5 shows first, second, and third chunks of data decomposed into first, second and third data sub-granules 510, 520 and 530, respectively. The first data sub-granule 510 includes 2 bits of data D0:D1, but maxDepth=3, so 11 bits can be covered with five resilience bits. Per block 440, nine address bits A0:A8 are distributed to the first sub-granule 510.

The second data sub-granule 520 includes nine data bits D2:D10, but mixing with leftover bits is not authorized per the addrBeGrpIdx parameter.

The third data sub-granule 530 also includes nine data bits D11:D19. Per block 440, two address bits A9:A10 are distributed to the third sub-granule 510.

Since the address is 16 bits, and eleven bits A0:A10 have already been distributed to the first and third data sub-granules 510 and 530, the five leftover bits A11:A15 are included in an address sub-granule 540. If the address bits were not mixed with the data bits, an additional address sub-granule would be needed to cover the 16-bit address.

Per block 450, resilience bits are generated for each of the sub-granules 510, 520, 530, and 540. ECC0 is generated from the first data sub-granule 510, ECC1 is generated from the second data sub-granule 512, ECC2 is generated from the third data sub-granule 530, and ECC3 is generated from the first address sub-granule 540. Size of each of ECC0, ECC1, ECC2 and ECC3 is five bits.

Per block 460, a 40-bit block 550 is written to the register memory 320. The block 550 includes the data bits of the data sub-granules and the ECCs. In the example of FIG. 5, the block 550 is ordered as follows: data bits (D0:D1) of the first data sub-granule and then its corresponding ECC0, data bits (D2:D10) of the second data-sub-granule and then its corresponding ECC1, data bits (D11:D19) of the third sub-granule and then its corresponding ECC2, and finally ECC3 (the address bits are not stored in register memory 320).

In the example of FIG. 5, each chunk can be covered by a single ECC. Therefore, each chunk is decomposed into a single data sub-granule. If, however, a chunk cannot be covered by a single ECC, then it is decomposed into multiple sub-granules.

Reference is now made to FIG. 6, which shows another example in accordance with the method of FIG. 4. In this example, resilienceAlgorithm=Hsiao_DED, maxDepth=3, and beGrpLst=[2,32,16]. Eleven bits of each sub-granule are covered with five resilience bits. The write address is 16 bits.

A first chunk 610 is decomposed into a first data sub-granule, a second chunk 620 is decomposed into second, third and fourth data sub-granules, and a third chunk 630 is decomposed into fifth and sixth data-sub-granules. As for the 16 bit address, 9 bits are distributed to the first data sub-granule, one bit is distributed to the fourth data sub-granule, and the remaining 6 bits are distributed to the sixth data sub-granule There are no leftover address bits, so an address sub-granule is not created.

An ECC is generated for each data sub-granule. A block 640 is written to the register memory 320. The block 640 includes the data bits of each of the data sub-granules and the ECCs, where each sub-granule (without distributed address bits) is followed by its corresponding ECC.

Reference is now made to FIG. 7, which illustrates a method of accessing data from a read address of the register memory. At block 710, the data at the read address is read. The read data includes read data bits of the sub-granules, and read resilience values.

At block 720, the address bits of the read address are added to the read data bits to form new data sub-granules, and at least one new address sub-granule is created from any leftover read address. At block 730, new resilience bits are computed for each new sub-granule.

At block 740, the new resilience bits are compared to the read resilience bits. If the comparison indicates no errors in the read data, the read data bits are assembled into chunks and outputted. If the comparison indicates a single bit error and SECDED was used to compute the resilience bits, the error in the accessed data is corrected, and the corrected read data bits are assembled into chunks and outputted. If there is more than a single error, then a fault is generated and the read data is not corrected or outputted.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Various examples are methods that use the behavior of either or a combination of machines. Method examples are complete wherever in the world most constituent steps occur. For example, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. In an electronic system, a method of writing data to a write address in register memory, the method comprising:

decomposing chunks of the data into a plurality of data sub-granules;

distributing bits of the write address to the plurality of data sub-granules;

creating an address sub-granule for any bits of the write address that were not distributed to the plurality of data sub-granules;

using a resilience algorithm to compute resilience bits for each of the plurality of data sub-granules; and writing the chunks and the resilience bits to the register memory.

2. The method of claim 1, wherein a number of data sub-granules and a number of data bits within each data sub-granule is parameter-driven.

3. The method of claim 1, wherein a resilience value of resilience bits provides maximum bit coverage; and wherein a given chunk is decomposed into multiple sub-granules when the given chunk exceeds the maximum bit coverage.

4. The method of claim 1, wherein a block is written to the register memory; wherein the resilience bits form resilience values; and wherein the block includes data bits of each of the plurality of data sub-granules and the resilience values, where each data sub-granule is followed by its corresponding resilience value.

5. The method of claim 1, wherein the resilience algorithm is an Hsiao double error detection (DED) algorithm.

6. The method of claim 1, further comprising receiving a request transaction including the data; wherein the data in the request transaction is decomposed into the chunks.

7. The method of claim 1, wherein the electronic system includes a network-on-chip (NoC) and the NoC includes a network interface unit (NIU) and the method further comprises receiving a request transaction containing write data at the NIU; and using the NIU to:

decompose the write data into the chunks;

decompose the chunks into the plurality of data sub-granules;

distribute write address bits to the plurality of data sub-granules;

create the address sub-granule for any bits of the write address that were not distributed to the plurality of data sub-granules;

compute the resilience bits; and write data bits of the plurality of data sub-granules and the resilience bits to the register memory.

8. The method of claim 1, further comprising:

reading data bits and resilience bits at a read address of the register memory;

combining address bits of the read address to read data bits to form new data sub-granules;

creating a new address sub-granule from any leftover read address bits;

computing new resilience bits for each new sub-granule;

comparing the new resilience bits to the read resilience bits; and performing error correction or detection based on the comparing.

9. A network-on-chip (NoC) comprising:

a transport interconnect; and a plurality of network interface units (NIUs) connected to the transport interconnect, wherein at least one of the NIUs includes register memory and a resilience generator configured to:

decompose chunks of data into a plurality of data sub-granules;

distribute bits of a write address to the plurality of data sub-granules;

create an address sub-granule for any bits of the write address that were not distributed to the plurality of data sub-granules;

compute resilience bits for each of the plurality of data sub-granules; and write the chunks and the resilience bits to the register memory.

10. The NoC of claim 9, wherein the resilience bits are interspersed with bits of the chunks when written to the register memory.

11. The NoC of claim 9, wherein a block is written to the register memory and the resilience bits form resilience values and the block includes data bits of the plurality of data sub-granules and the resilience values, where each data sub-granule is followed by its corresponding resilience value.

12. The NoC of claim 9, wherein the resilience bits are computed with an Hsiao double error detection (DED) algorithm.

13. The NoC of claim 9, wherein the resilience generator is configured to receive a request transaction; and decompose data in the request transaction into the chunks.

14. The NoC of claim 9, wherein the at least one of the NIUs further includes a resilience checker configured to:

read data bits and resilience bits at a read address of the register memory;

combine the read data bits and read address bits to form new data sub-granules;

create a new address sub-granule from any leftover read address bits;

compute new resilience bits for the new data sub-granules;

compare the new resilience bits to the read resilience bits; and perform error correction or detection based on the comparing.

15. An electronic system comprising:

an initiator; and a network-on-chip (NoC) including a network interface unit (NIU) configured to:

receive data from the initiator;

decompose the data into chunks;

decompose the chunks into a plurality of data sub-granules;

distribute bits of a write address to the plurality of data sub-granules;

create an address sub-granule for any bits of the write address that were not distributed to the plurality of data sub-granules;

compute resilience bits for each of the plurality of data sub-granules; and write the chunks and the resilience bits to a register memory.

16. The system of claim 15, wherein the resilience bits are interspersed with the chunks when written to the register memory.

17. The system of claim 15, wherein a block is written to the register memory; wherein the resilience bits form resilience values; and wherein the block includes data bits of the plurality of data sub-granules and the resilience values, where each data sub-granule is followed by its corresponding resilience value.

18. The system of claim 15, wherein the resilience bits are computed with an Hsiao double error detection (DED) algorithm.

19. The system of claim 15, wherein the NIU includes a resilience generator and the register memory, the resilience generator is configured to decompose the data into the chunks, distribute the bits, create the address sub-granule, compute the resilience bits, and write the chunks and the resilience bits to the register memory.

20. The system of claim 15, wherein the NIU is further configured to:

read data bits and resilience bits at a read address of the register memory;

combine the read data bits and bits of the read address to create new data sub-granules;

create a new address sub-granule from any leftover read address bits;

compute new resilience bits for each new sub-granule;

compare the new resilience bits to the read resilience bits; and perform error correction or detection based on the comparing.

* * * * *